United States Patent Office 2,805,243
Patented Sept. 3, 1957

2,805,243

PRODUCTION OF NITRILES

Heinz Noeske, Oberhausen-Sterkrade, and Helmut Kolling, Duisburg-Hamborn, Germany, assignors to Ruhrchemie Aktiengesellschaft, Oberhausen-Holten, Germany, a German corporation No Drawing. Application June 24, 1953,
Serial No. 363,928

Claims priority, application Germany July 9, 1952

7 Claims. (Cl. 260—465.1)

The catalytic production of nitriles from primary alcohols and ammonia is known. In most cases the catalyst used is an aluminum oxide catalyst which has been activated with suitable materials, such as, for example, thorium oxide or molybdenum oxide. With the use of these catalysts, however, the yields are not satisfactory and at best reach 50%, and, in most cases, are considerably lower than 50%.

It is also known to activate aluminum oxide catalysts with silver or copper. This will result in a considerable increase in the yield, but the catalysts will have only a relatively short life. After a relatively short period of operation, the catalyst becomes covered with carbon, which considerably reduces its activity. After a reaction period of only a few hours, the silver or copper activated aluminum oxide catalysts must be regenerated by a treatment with oxygen-containing gases followed by a reduction with hydrogen-containing gases, which is time-consuming and expensive.

One object of this invention is the catalytic production of nitriles from primary alcohols and ammonia without the above-mentioned difficulties.

A further object of this invention is the catalytic production of nitriles in high yields with a long catalyst life. These, and still further objects will become apparent from the following description:

It has now been found that surprisingly high yields are obtained in the catalytic conversion of primary alcohols and ammonia without the necessity of periodic regeneration of the catalyst if the alcohols to be converted are passed together with an excess of ammonia in the gaseous phase at temperatures of 300°–470° C. and preferably 360°–420° C. over iron and/or iron oxide catalysts. The catalysts, in addition to the iron and/or iron oxides, may contain supporting materials such as, for example, kieselguhr, bleaching earths, ceramic masses, etc. The catalysts used may be produced by precipitation from iron salt solution, as well as by fusing or sintering processes.

The load of the catalysts is adapted to the reaction temperatures used. In general, a load of 25–50 liters of liquid alcohol per 100 liters of catalyst per hour is used. It is, however, possible to effect the process in accordance with the invention with a higher or lower load.

The new process may be effected at atmospheric pressure, though higher and lower pressures may be used, depending on the particular circumstances. An excess of ammonia is of advantage in all cases. It is possible, for example, to operate with three to five times the theoretically required quantity of ammonia.

The catalysts used in accordance with the invention need not be regenerated during operation. They retain their catalytic activity over extremely long operational periods which, for example, may extend over several months.

Several processes may be used for the production of the iron-containing catalysts used in accordance with the invention. The catalysts may be prepared by precipitation from iron salt solutions, as well as by fusing together or sintering together the components. No substantial difference exists between the activity and efficiency of precipitated and fused or sintered catalysts. The fused or sintered catalysts, however, have a greater hardness than the precipitated catalysts.

In general, the iron- and/or iron oxide-containing catalysts have an excellent activity when used without supporting materials. Good yields are, however, also obtainable when the iron- and/or iron oxide-containing catalysts have been prepared by precipitation from suitable iron salt solutions on supporting materials, such as, for example, kieselguhr, pumice, aluminum oxide and similar materials.

It is preferable to reduce the catalyst with hydrogen prior to its use. The extent of the reduction is of minor importance, however, since during operation the catalyst will adjust itself to the mean reduction value independent of the original reduction value. After a period of operation, 15–25% of the iron within the catalyst will generally be present in the metallic state, while 40–60% will be present as FeO and 15–55% in the form of $Fe_2O_3$. The reduction of the cataypst may be effected within the reaction tube itself. It is possible to use the starting materials of the nitrile production as reducing agents, since, as mentioned, the adjustment of the catalyst to the correct oxide in metallic proportions automatically occurs during operation.

It is of particular advantage to activate the iron catalyst used in accordance with the invention with suitable activating materials. The addition of 1–5% of alkali metal oxides is advantageous. Copper is also of advantage as an activating material. In general, copper in an amount of less than 10% may be admixed with the iron-iron oxide mixtures. It is also possible, however, to use copper contents as high as 30% by weight. The addition of silicic acid has also been found to increase the catalyst activity. The quantity of $SiO_2$ added may reach approximately 30% by weight. The $SiO_2$ may be incorporated before or after the precipitation of the metallic salts when the catalyst is prepared in this manner.

The conversion of the starting alcohols used for the nitrile production is effected in the gaseous phase by passing over stationary catalysts. It is preferable to position these catalysts as a fixed bed in a vertical tube with external temperature control. The alcohol-ammonia mixture which has been preheated to reaction temperature is preferably passed from above through the catalyst layer. The process, however, may be effected in any known mode or manner for contacting gaseous reactants with solid catalysts.

It is possible by means of the process according to the invention, to process primary alcohols which contain at least two carbon atoms in the molecule. The processing of primary alcohols containing 4–20 carbon atoms in the molecule is of particular advantage.

The catalysts used may have any grain size. It is expedient to use catalyst grains of 3–6 mm. diameter. The quantity of inert materials, i. e. of supporting materials present in the catalyst may vary within wide limits. It is also possible to use catalysts which contain no supporting materials. Catalysts which contain as much as 2 parts by weight of inert constituents per part by weight of iron are most suitable for the process in accordance with the invention. Suitable materials for the activation of the catalysts are oxides, hydroxides or carbonates of sodium or potassium. Most suitable as activators are potassium hydroxide or potassium carbonate.

The excess of ammonia used in accordance with the invention amounts to at least 10% of the stoichiometrically required quantity. However, it is also possible to use a considerably higher excess of ammonia of as high as 400%.

The process may be effected under any pressure. Atmospheric pressure or slightly elevated or reduced pressures are most suitable.

The following examples are given by way of illustration and not limitation:

Example 1

280 cc. of a fused catalyst which consisted of 100 parts by weight of iron and 1.5 parts by weight of potassium oxide were filled into a vertical glass tube of 23 mm. inside diameter. This catalyst had previously been reduced with hydrogen at elevated temperature.

Over the catalyst which was heated to 400° C. within the glass tube, there were hourly passed from above 100 cc. of hexanol mixed with 100 liters of ammonia. The gaseous reaction products leaving the lower end of the catalyst tube were condensed in a device which was cooled by a cold salt solution. With a single passage through the catalyst layer, a quantity of $C_6$ nitrile corresponding to 80% of the yield, which was theoretically to be expected, was obtained.

Example 2

The apparatus used in Example 1 was filled with 280 cc. of a catalyst which had been prepared by precipitation and consisted of 100 parts of iron, 5 parts of copper, and 2 parts of potassium oxide, and which had been reduced with hydrogen. This catalyst was heated within the reaction tube to 400° C. With a passage of 100 cc./hr. of hexanol mixed with 100 liters of ammonia, an 82% yield of $C_6$ nitrile was obtained.

Example 3

280 cc. of a catalyst which had been prepared by precipitation was filled into the apparatus described in Example 1. The catalyst contained 100 parts of iron, 5 parts of copper, 5 parts of potassium oxide and 100 parts of kieselguhr, and had previously been reduced with hydrogen in the conventional manner.

Over the catalyst which was heated to 400° C., there were hourly passed 100 cc. of hexanol mixed with 100 liters of ammonia. An 83% yield of $C_6$ nitrile could be withdrawn at the lower end of the reaction tube.

Example 4

280 cc. of a fused catalyst consisting of 100 parts of iron, 25 parts of copper, 2.5 parts of potassium oxide and 10.5 parts of silicic acid were used for the conversion with the use of the apparatus described in Example 1. The catalyst which had previously been reduced with hydrogen was heated for the conversion to 400° C. Thereupon, 100 cc. of hexanol and 100 liters of ammonia were hourly passed over the catalyst. From these materials, $C_6$ nitrile formed in an 87% yield.

Example 5

100 cc. of hexanol and 100 liters of ammonia were passed hourly at 400° C. over 280 cc. of a catalyst which had previously been reduced with hydrogen. The catalyst consisted of 100 parts of iron, 5 parts of copper, 5 parts of potassium oxide and 25 parts of silicic acid, and had been prepared by precipitation. $C_6$ nitrile in an 88% yield was obtained as the reaction product.

Example 6

The apparatus used in Example 1 was filled with 280 cc. of a catalyst which consisted of 100 parts of iron, 5 parts of copper, 5 parts of potassium oxide and 25 parts of silicic acid. The catalyst had been prepared by precipitation and previously been reduced with hydrogen. 90 cc. of butanol mixed with 100 liters of ammonia were hourly passed at 400° C. over this catalyst. The final product was butyronitrile in an 84% yield.

Example 7

70 liters of ammonia and 80 cc. of a $C_{10}$ alcohol which had been produced by means of the oxo synthesis followed by hydrogenation, were hourly passed at 380° C. over 280 cc. of the catalyst used in Example 6. The final product was $C_{10}$ nitrile, the quantity of which corresponded to 90% of the theoretical yield.

Example 8

280 cc. of a non-reduced catalyst having the composition of the catalyst used in Example 5 was filled into the apparatus used in Example 1. 80 cc. $C_{10}$ alcohol mixed with 70 liters of ammonia were hourly passed at 380° C. over this catalyst. After a starting period of 5 hours, the same results as obtained according to Example 7 with the use of the previously reduced catalyst were obtained.

Example 9

200 cc. of a catalyst which had been prepared by precipitation from corresponding salt solutions with the addition of kieselguhr was filled into a vertical glass tube of 23 mm. inside diameter as described in Example 1. This catalyst contained 5 parts of copper, 5 parts of potassium oxide and 100 parts of kieselguhr per 100 parts by weight of iron. The catalyst mass had been reduced with hydrogen in the usual manner after the precipitation and drying.

100 cc. cetyl alcohol mixed with 60 liters of gaseous ammonia were hourly passed over the catalyst at 380° C. and atmospheric pressure. Hexadecane nitrile in a 79% yield was obtained as the end product.

We claim:

1. Process for the catalytic production of saturated aliphatic nitriles, which comprises passing a gaseous mixture of a saturated aliphatic primary alcohol and an excess of ammonia in contact with a substantially aluminum oxide-free, potassium oxide-containing catalyst selected from the group consisting of iron catalysts, iron oxide catalysts, and iron-iron oxide catalysts, and containing, in addition, a silicic acid-supporting material, which is selected from the group consisting of silicic acid, kieselguhr, pumice, bleaching earths, and ceramic masses, at a temperature of 300° to 470° C., and recovering a nitrile.

2. Process according to claim 1, in which said contacting is effected at a temperature of 360°–420° C.

3. Process according to claim 1, in which said catalyst is a precipitated catalyst.

4. Process according to claim 1, in which said catalyst is a fused and sintered catalyst.

5. Process according to claim 1, in which said potassium oxide is present in amount of 1–5% by weight.

6. Process according to claim 1, in which said catalyst contains 10–30% by weight of copper.

7. Process according to claim 1, in which said catalyst contains up to 30% silicic acid.

References Cited in the file of this patent

UNITED STATES PATENTS

| Number | Name | Date |
|---|---|---|
| 2,337,421 | Spence et al. | Dec. 21, 1943 |
| 2,337,422 | Spence et al. | Dec. 21, 1943 |
| 2,487,299 | Bishop et al. | Nov. 8, 1949 |
| 2,500,256 | Mahan | Mar. 14, 1950 |
| 2,644,834 | Max | July 7, 1953 |

OTHER REFERENCES

Shuykin et al.: Jour. of Physical Chemistry, vol. 39, pp. 1197–1205 (1935).